United States Patent
Virhiä

(10) Patent No.: US 10,468,902 B2
(45) Date of Patent: Nov. 5, 2019

(54) SENSOR CHARGER AND CALIBRATION CASE

(71) Applicant: Zen-me Labs Oy, Tampere (FI)

(72) Inventor: Toni Matti Virhiä, Tampere (FI)

(73) Assignee: Zen-me Labs Oy, Tampere (FI)

( * ) Notice: Subject to any disclaimer, the term of this patent is extended or adjusted under 35 U.S.C. 154(b) by 124 days.

(21) Appl. No.: 15/346,763

(22) Filed: Nov. 9, 2016

(65) Prior Publication Data

US 2018/0131217 A1    May 10, 2018

(51) Int. Cl.
  *H02J 7/02*   (2016.01)
  *H02J 7/00*   (2006.01)
  *H02J 50/10*  (2016.01)

(52) U.S. Cl.
  CPC ............ *H02J 7/025* (2013.01); *H02J 7/0027* (2013.01); *H02J 7/0044* (2013.01); *H02J 50/10* (2016.02)

(58) Field of Classification Search
  CPC .............................. H02J 7/0027; H02J 7/0044
  See application file for complete search history.

(56) References Cited

U.S. PATENT DOCUMENTS

| | | | | |
|---|---|---|---|---|
| 5,517,434 A | * | 5/1996 | Hanson | B60R 11/02 361/679.41 |
| 5,600,225 A | * | 2/1997 | Goto | H02J 7/0004 320/108 |
| 2009/0295328 A1 | * | 12/2009 | Griffin, Jr. | H02J 7/0027 320/115 |
| 2012/0305735 A1 | * | 12/2012 | McSweyn | F16M 11/10 248/451 |

* cited by examiner

*Primary Examiner* — Jeffrey M Shin
(74) *Attorney, Agent, or Firm* — BelayIP

(57) ABSTRACT

A sensor charging case having multiple receptacles for multiple sensors. One receptacle is for charging while the other receptacles are for holding additional sensors. The receptacles can be arranged to hold the sensors releasably by the sides and leaving at least two surfaces generally exposed to the environment, e.g. two opposite surfaces such as a front and back of the sensor. By leaving the front surface of the sensor exposed a user can see what sensor is being held and/or the sensing element on the front surface of the sensor can be exposed to the environment. By leaving the back surface of the sensor exposed a user can remove the sensor and/or heat can be effectively transferred away from the back of the sensor to the environment.

20 Claims, 6 Drawing Sheets

SENSOR CHARGER AND CALIBRATION CASE

FIELD OF INVENTION

The present invention relates to the field of charger devices. In particular to charger devices for a plurality of sensor units.

BACKGROUND OF INVENTION

There will exist a new category of electronics called virtual or personal sensors. Such sensors are small, inexpensive and versatile, allowing users to customize not only how they use data, but how they collect data.

Many sensors have low power consumption and therefore are able to operate off of a battery for an extended period of time. In order to keep costs low for sensors, it is therefore advantageous to have multiple sensors which are battery operated and which can share a single charging platform. Additionally, when several different sensors are to be used in the same space, it is desirable to have a case which can house multiple sensors.

Several problems exist in current solutions, e.g. they are large, expensive and relatively complex and thus prone to failure. There exists a need for a charger for a plurality of sensors which meets the demands of an emerging field of products.

Additionally, there exists a need for such a solution which can also act as a configuration case where sensors can be stored in a predictable manner so that after being calibrated in one configuration then can be released and replaced multiple times without further calibration.

SUMMARY OF THE INVENTION

Disclosed herein is a sensor charger case capable of holding multiple sensor units.

The sensor charger case may comprise a frame having more than one receptacles for releasable holding sensor units, wherein one receptacle is for charging a sensor unit and at least one other receptacle is for holding a sensor unit, a power charger coupled to the frame and arranged to be able to charge a sensor unit held in the charging receptacle, and a releasing means associated with each receptacle for releasing a sensor unit held therein.

According to certain examples, the power charger is an induction power charger. The power charger may also include, together with or separately from the induction power charger, a battery(s) and/or a separate power input.

The releasing means associated with the charging receptacle can be different than the releasing means associated with the at least one other holding receptacle. The releasing means associated with the charging receptacle can be an indentation in the frame which allows access to a side of a sensor unit such that the sensor unit can be removed by a user. The releasing means associated with the other housing receptacles can be an opening in the back which allows access to the back of a sensor unit to be removed by a user.

Additionally, the receptacles can be arranged to hold the sensors releasably by the sides and leaving at least two surfaces generally exposed to the environment, e.g. two opposite surfaces such as a front and back of the sensor. By leaving the front surface of the sensor exposed a user can see what sensor is being held and/or the sensing element on the front surface of the sensor can be exposed to the environment. By leaving the back surface of the sensor exposed a user can remove the sensor and/or heat can be effectively transferred away from the back of the sensor to the environment.

DETAILED DESCRIPTION OF EXEMPLARY EMBODIMENTS

With the new category of consumer electronics, personal sensors, comes new challenges. One is how to provide a charging platform for a plurality of sensor units which is small, inexpensive and robust. With personal sensors, the concept is to be able to combine a plurality of sensor units based on a user's specific need. For example, one user may need a humidity sensor, temperature sensor, light sensor and a geospatial sensor. That user may not need other sensors such as a sound sensor or pressure sensor. As such, the user should be able to select only the sensors needed and use them as needed.

Many sensors units have relatively low power consumption and therefore can operate on battery power for a period of time. For such battery powered sensors it is convenient to have one charger which is capable of charging a plurality of sensors. However, it is not always necessary to charge multiple sensor units at the same time. As such, it is possible to minimize the size and cost of charger units based on the chargers presented herein.

Figure 1:
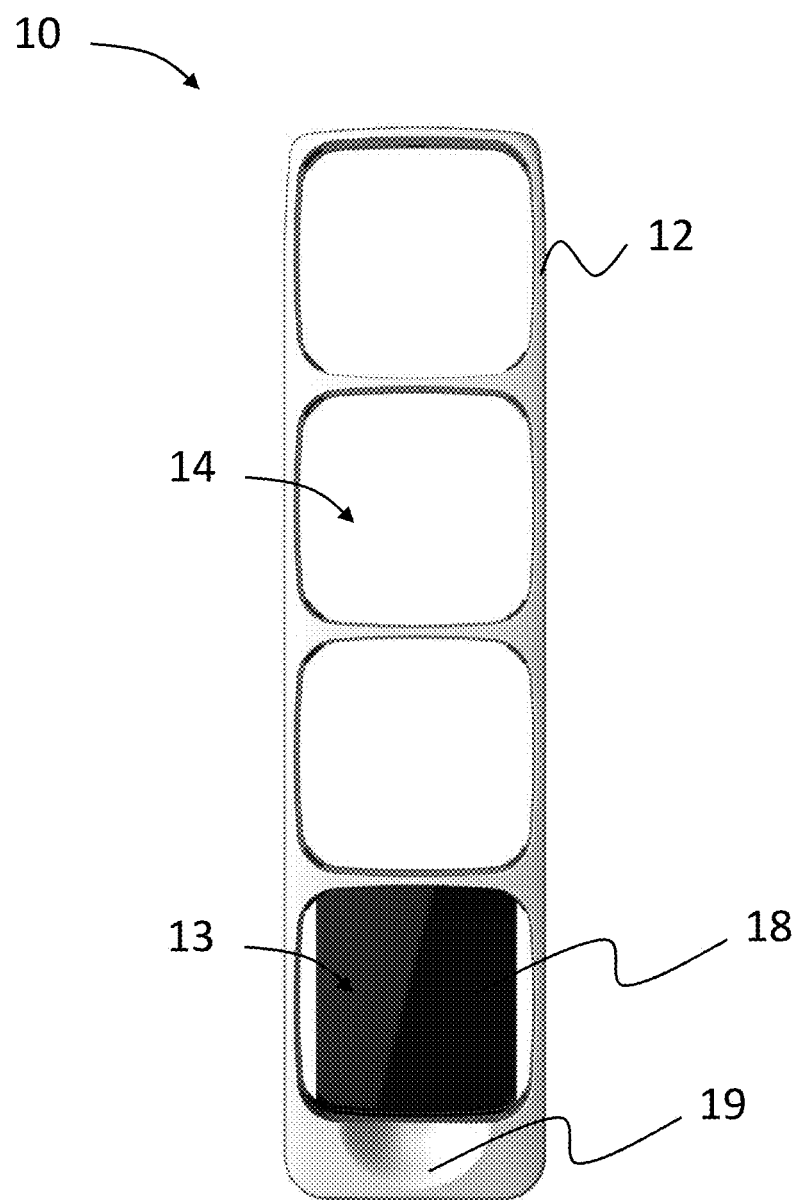
FIG. 1 shows a front view of an example case.

FIG. 1 shows a sensor charger case 10 capable of holding multiple sensor units. The sensor charger case 10 includes a frame 12 having more than one receptacles 13 & 14 for releasable holding sensor units. One receptacle 13 is for charging a sensor unit. The sensor charger case 10 then has at least one other receptacle 14 for merely holding a sensor unit and not for immediately charging the sensor unit.

The sensor charger case 10 includes a power charger 18. The power charger 18 is coupled to the frame 12 and arranged to be able to charge a sensor unit held in the charging receptacle 13. The sensor charger case 10 can also include one or more releasing means associated with one or more receptacles for releasing a sensor unit held therein.

The power charger can be an induction power charger. As such, the induction power charger would not have any physical electrical contacts electrically connecting the charger to the sensor unit. According to certain examples, the sensor unit can be a symmetric shape such as a square. With an induction power charger, a user could insert the sensor unit in a plurality of orientations making use of the charger easier. However, other conventional chargers can be used which employ one or more electrical contacts between the charger and the sensor unit.

The power charger may itself contain one or more batteries. The power charger can also include one or more power input, e.g. an DC input, and AC input, a USB input, a micro USB input or any other standard power input. The input 41 can be located directly on the power charger 18 or it can be located on another portion of the frame 12, for example the bottom 22 of the frame 12. Furthermore, there may be a charging indicator light or one or more other indicators located at any point on the frame or power charger.

The power charger can be fixedly arranged in connection with a specific charging receptacle 13 of the charging case 10. An advantage of this is that the complexity of the charging case can be kept to a minimum. Additionally, the charging receptacle 13 can be specifically designed to take into account the needs of the power charger. However, the location of the power charger can be adjustable if desired to be located with respect to one or more other receptacles. Such relocation can be facilitated by a rail system on the back of the charger case which the power charger can move along with respect to the plurality of receptacles.

The releasing means for the receptacles can be any of a number of reasonable releasing means. There may be more than one per receptacle. The releasing means may be the same for all of the receptacles or certain receptacles can have different types of releasing means. For example, a charging receptacle 13 can have one type of releasing means and the holding receptacles 14 can have a different type of releasing means.

FIG. 1 shows the releasing means of the charging receptacle to be the indentation 19 in the frame 12. The indentation allows access to a side of a sensor unit that would be placed in the charging receptacle 13. Such an indentation would allow the finger of a user to access the side of a sensor and break the friction bond or a mechanical bond of the sensor unit to the receptacle. While such an indentation is shown with respect to the charging receptacle, such an indentation or similar indentation can be used with any of the other receptacles as well. Similarly, a portion of one or more of the sides of the frame can be removed near the side of the receptacle in order to give a user's finger(s) access to the side of a sensor unit housed within the receptacle.

The opening in the back of the frame 12 corresponding to each of the receptacles also acts as a releasing means. With a sensor unit in the holding receptacle 14 a user can push from the back of the frame through the opening in order to release the sensor unit from a friction and/or mechanical bond to the frame/receptacle. As can be seen though in FIG. 1, such a back opening is not easily possible for the charging receptacle having a power charger 18 located at the back of the opening of the frame 12. The back of the receptacles can also have a lip or other mechanism which prevents a sensor unit from going all the way through the receptacle.

The receptacles can be capable of holding a sensor unit by a friction means, a mechanical means or a combination thereof. Examples of a friction means can be having a receptacle which has dimensions which are capable of holding a specific sensor design using only friction. Additionally, the receptacle can have one or more features around and/or inside the receptacle aiding in the holding of the sensor.

Figure 2A:
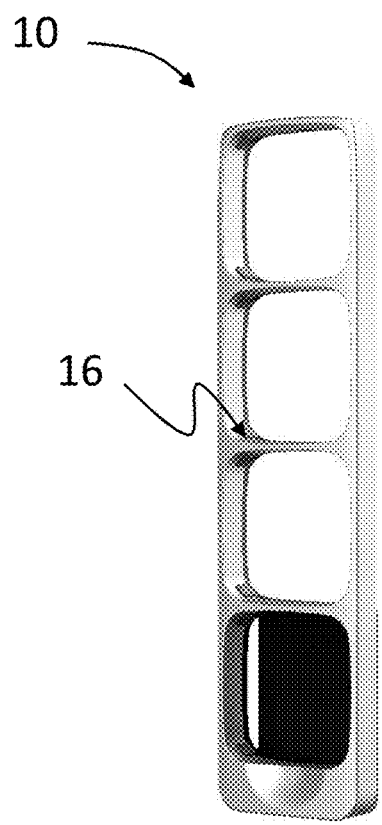
FIG. 2a shows an isometric view of a front of the example case of FIG. 1.
Figure 2B:
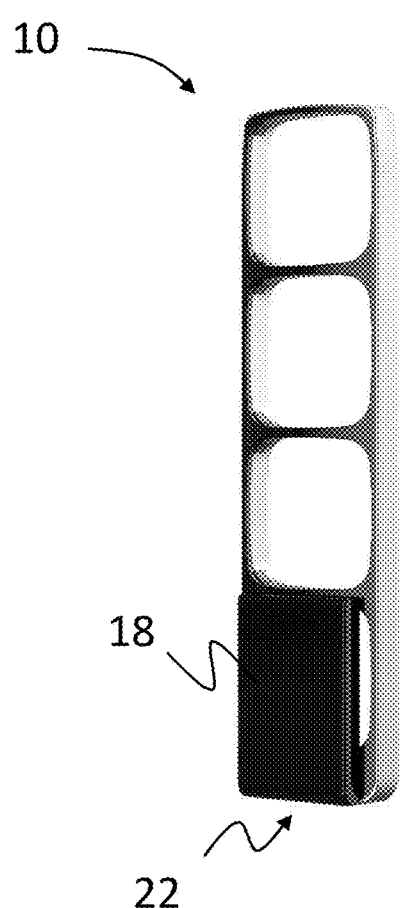
FIG. 2b shows an isometric view of a back of the example case.

FIGS. 2a and 2b show pads 16 in the corners of the receptacles. Each receptacle can have one or more of these pads in order to provide a secure and releasable friction hold of a sensor unit housed in the receptacle. As shown, there can be a pad 16 in each corner of the receptacle. Pads can also be located on the sides of the receptacle, all around the receptacle or a combination thereof. Other friction means can be used such as one or more lip, for example on a front or back of a receptacle.

Mechanical means can also be used to hold and or aid in the holding of a sensor unit within a receptacle. Such mechanical means can include a latch, a spring mechanism, a door or partial door, a clip or another mechanical holding device. As such, should a mechanical means be used to hold or aid in the holding of a sensor unit, a suitable mechanical release means or mechanism should be provided.

The means which holds a sensor in place is selected such that it does not interfere or restrict the measurement from the sensor. Certain sensors can have a measurement means on a surface, for example a top surface, of the sensor. For example, a light sensor or humidity sensor may have a sensor lens or film on the top of the sensor. The housing receptacle for such sensors should not block the sensing surface from the environment. As seen in the figures, the holding means which holds the sensors in the holding receptacles substantially holds the sensor on the edges and leaves the top surface exposed to the environment.

Additionally, sensing elements and sensors can generate heat during use. The holding means which holds the sensor in the housing receptacle can be arranged such that it facilitates heat transfer away from the sensor. This can also be achieved through the materials used with the frame or materials which are in direct contact with the sensors on, within and/or around the housing receptacles. As shown in the figures, the back of the housing receptacles can be open. The opening on the back of the receptacles can be virtually the whole back of the receptacle as shown or it can be only a portion open to the environment. However, by being open to the environment heat transfer away from the sensors can be facilitated while the sensor is held. The opening or partial opening on the back of the housing receptacle also facilitates releasing of the sensor as the sensor can be pushed out of the housing receptacle from the back by, for example a finger.

Furthermore, all of the housing receptacles can be identical or one or more of the housing receptacles can be specifically modified for a particular type of sensor. For example, one receptacle, for example the one furthest from the power charger, can be designated or adapted for a particular type of sensor, e.g. a temperature sensor, which is most sensitive to side effects of charging, e.g. EMP, static and temperature. Additionally, one or more of the housing receptacles may have an extra cover or casing on one or both sides for a sensor which would benefit from such a casing or cover.

Figure 3:
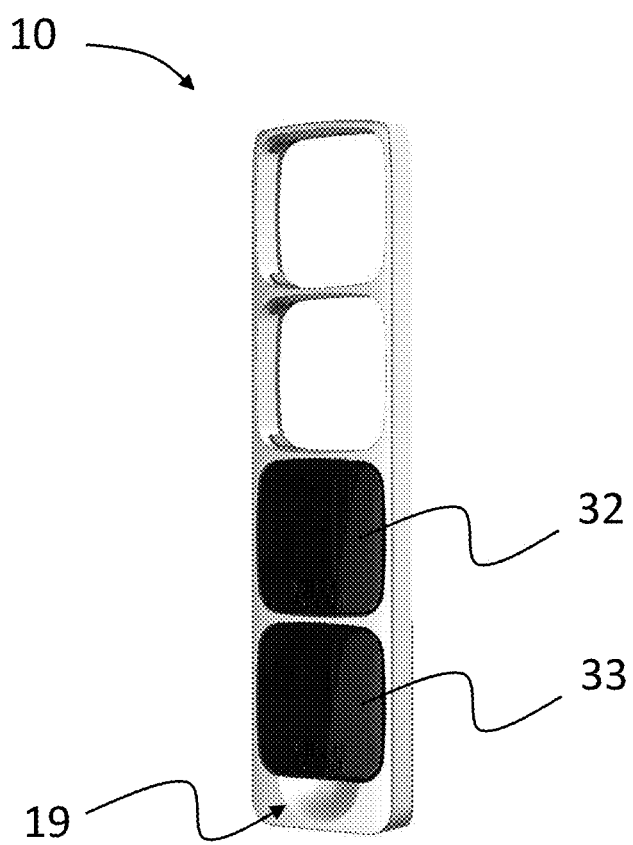
FIG. 3 shows an isometric view of a front of an example case holding two sensor units.
Figure 4A:
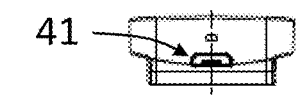
FIGS. 4A-D show a bottom, front, side and rear view respectively of an example case.
Figure 4B:
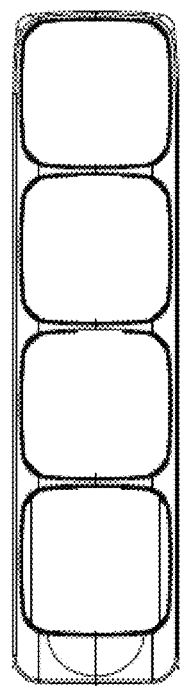
Figure 4C:
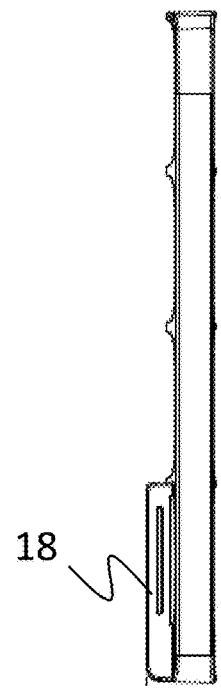
Figure 4D:
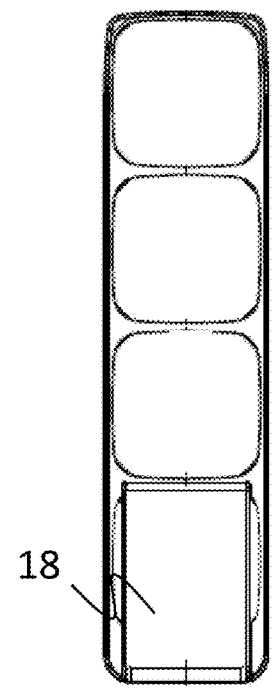

FIG. 3 shows a sensor charger case 10 having a first sensor unit 33 in the charging receptacle and a second sensor unit 32 held in a holding receptacle immediately in line above the first sensor unit. The receptacles are arranged in a fixed and predetermined manner with respect to each other.

In the example for FIG. 3, there is one charging receptacle at the bottom of a line of receptacles. In the example there are three holding receptacles above the charging receptacle. There can be more or fewer holding receptacles, e.g. 2, 4 or 5 holding receptacles. Additionally, the holding receptacles can be arranged in a geometric shape other than a line. For example, they can be horizontally arranged, the can be arranged in a group, in a star, in a circle or otherwise arranged organically but in a fixed orientation.

Each sensor can have one or more icons on them which indicate visual information about the sensor. The housing receptacles can be such that when the sensors are releasably affixed within the housing receptacle that at least one of the icons on the sensor can be seen.

The sensor charger case can also be capable of being a calibration case. A plurality of sensors can be releasable held and replaced within a sensor charger case. The plurality of sensors can be calibrated and/or registered, by any means, a single time. Then the sensor units can be removed, replaced and even replaced in another order within the sensor charger case while maintaining their calibration and/or registration. This can be due to the fixed and known relationship of the receptacles to each other.

Additionally, the sensor charger case can have a registration id, for example such as an RFID tag, another passive tag or an active ID tag. As such, multiple sensor units having their own digital ID's can be registered in cooperation with the sensor charger case. The digital ID tag of the sensor charger case can then be used to organize and link the multiple sensor units.

Furthermore, there can be a system, as shown in FIG. 3, including a sensor charger case as described above in connection with at least two sensor units. The sensor charger system can be for releasable holding a plurality of sensors in a predefined and repeatable arrangement. Each of the receptacles can have a shape which directly corresponds to the at least two sensor units and is capable of releasable holding said sensor units.

FIG. 4 shows a wireframe example of a sensor charger 10 from four angles. As can be seen, the bottom of the sensor charger in FIG. 4A has a power input 41. Above the power input can be seen a light which can be used to show that the power is connected or for other informational purposes.

Figure 5:
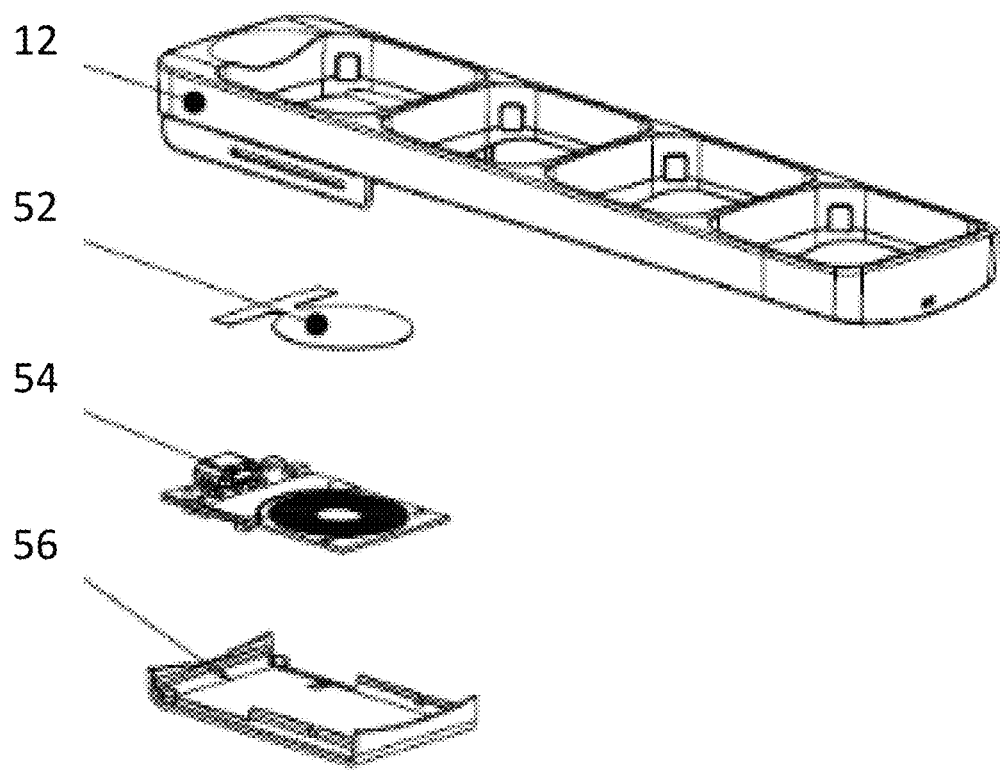
FIG. 5 shows an exploded view of an example power charger.
Figure 6:
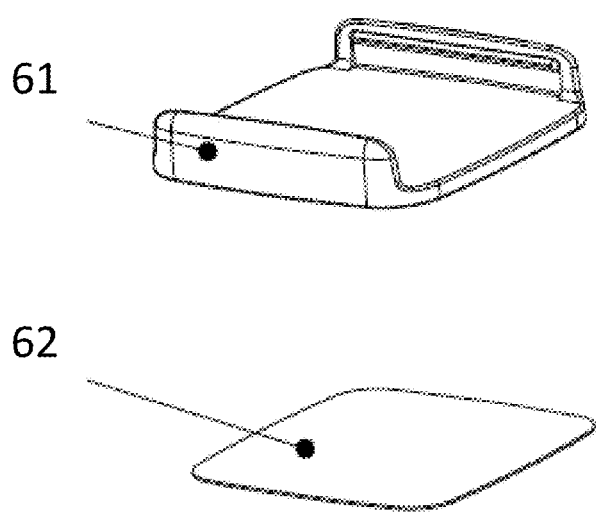
FIG. 6 shows an example holder for a charger.

FIG. 5 shows an exploded view of an example sensor charger. A charger PCBA, or charger PCB, 54 can be attached to a portion of the frame 12 by an adhesive 52. As such, the charger PCBA 54 can be fixed to a single holding receptacle. The charger PCBA can be protected from the environment by a lid 56. The lid 56 can have a complementary size to a sensor charger stand or mounting device, for example as shown in FIG. 6. The lid 56 may also be replaceable in order to facilitate different mounting devices or to include one or more batteries or additional power input means to the charger PCBA.

FIG. 6 shows an example sensor charger stand 61. The sensor charger stand 61 can be integrated with a sensor charger 10 or it can be separate. The sensor charger stand 61 can also include an adhesive portion 62. The adhesive portion can be a double sided adhesive such that it is capable of adhering the sensor charger stand 61 to an object in a permanent or semi-permanent manner. The sensor charger stand can have two or more raised sides, as shown, which are capable of holding all or a portion of the sensor charger. According to certain examples, the sensor charger stand has dimensions capable of holding, permanently or releasably, the power charger 18 portion of the sensor charger 10.

The sensor charger stand 61 can be square as shown. In such an example, if the power charger 18 is square and of similar size, then then the sensor charger 18 can be mounted to the sensor charger stand in either a vertical or horizontal position. In an embodiment where the sensor charger is releasably affixable to the sensor charger stand then it can thus be mounted in either orientation based on a user's desire and then adjusted if needed without needing to change the mounting of the sensor charger stand itself.

Additionally, application Ser. No. 14/631,602 to a system and method for social sensor platform based private social network describes a system of sensors which can be used with the sensor charger described herein and can be otherwise used within the system described in the application. Said application Ser. No. 14/631,602 is incorporated by reference herein in its entirety.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A sensor charger case capable of holding multiple sensor units comprising,
 a frame having more than one receptacles for releasable holding sensor units, wherein one receptacle is for charging a sensor unit and at least one other receptacle is for holding a sensor unit,
 a power charger coupled to the frame and arranged to be able to charge a sensor unit held in the charging receptacle, and
 a releasing means associated with each receptacle for releasing a sensor unit held therein.

2. The sensor charger case of claim 1, wherein the power charger is an induction power charger.

3. The sensor charger case of claim 1, wherein the power charger includes a battery and/or a power input.

4. The sensor charger case of claim 1, wherein the releasing means associated with the charging receptacle is different than the releasing means associated with the at least one other holding receptacle.

5. The sensor charger case of claim 1, wherein the releasing means associated with the charging receptacle is an indentation in the frame which allows access to a side of a sensor unit such that the sensor unit can be removed by a user.

6. The sensor charger case of claim 1, wherein the releasing means is an opening in the frame associated with a receptacle which allows a user to push a sensor unit out of the receptacle.

7. The sensor charger case of claim 1, wherein the receptacle is capable of holding a sensor unit by a friction means and/or a mechanical means.

8. The sensor charger case of claim 1, wherein each receptacle includes at least one corner pad located in a corner of the receptacle in order to provide a secure and releasable friction hold of a sensor housed in the receptacle.

9. The sensor charger case of claim 1, wherein the power charger is fixedly arranged in connection with a single charger receptacle.

10. The sensor charger case of claim 1, wherein the power charger is capable of being physically arranged in connection with different receptacles.

11. The sensor charger case of claim 1, wherein the receptacles are arranged in a fixed and predetermined manner with respect to each other.

12. The sensor charger case of claim 11, wherein the sensor charger case is capable of being a calibration case where a plurality of sensors can be releasable held and replaced without recalibration due to the fixed and known relationship of the receptacles to each other.

13. The sensor charger case of claim 1, having one charging receptacle at the bottom of a line of receptacles.

14. The sensor charger case of claim 13, wherein the line of receptacles consists of the bottom charging receptacle and three holding receptacles.

15. The sensor charger case of claim 1, further comprising a digital id tag for the sensor charger case located on or within the frame.

16. A sensor charger system for releasable holding a plurality of sensors in receptacles in a predefined and repeatable arrangement, said system comprising;
   a sensor charger,
   at least two sensor units,
   wherein each of the receptacles has a shape which directly corresponds to the at least two sensor units and is capable of releasable holding said sensor units with a friction means,
   wherein the receptacles are arranged in a fixed and predetermined manner with respect to each other, and
   wherein the sensor charger system is capable of being a calibration case where a plurality of sensors can be releasable held and replaced without recalibration due to the fixed and known relationship of the receptacles to each other.

17. The sensor charger system according to claim 16, further comprising a digital id tag for the sensor charger.

18. The sensor charger system according to claim 16, further comprising:
   a releasing means associated with each receptacle for releasing a sensor unit held therein, and
   wherein the releasing means is an opening in the frame associated with a receptacle which allows a user to push a sensor unit out of the receptacle.

19. The sensor charger system according to claim 16, wherein the calibration case is made of a heat dissipating material.

20. The sensor charger system according to claim 16, further comprising a power source and wherein:
   at least two of the receptacles comprise different shapes, and
   at least one of the different shapes is selected to accommodate a sensor distal to the power source.

* * * * *